(12) United States Patent
Tamai et al.

(10) Patent No.: US 10,486,752 B2
(45) Date of Patent: Nov. 26, 2019

(54) AUTOMOBILE FRAME COMPONENT

(75) Inventors: Yoshikiyo Tamai, Tokyo (JP); Takeshi Fujita, Tokyo (JP); Yasushi Kitani, Tokyo (JP); Hiroyuki Takebe, Saitama (JP)

(73) Assignee: JFE Steel Corporation, Tokyo (JP)

( * ) Notice: Subject to any disclaimer, the term of this patent is extended or adjusted under 35 U.S.C. 154(b) by 647 days.

(21) Appl. No.: 14/004,348

(22) PCT Filed: May 16, 2012

(86) PCT No.: PCT/JP2012/062478
§ 371 (c)(1),
(2), (4) Date: Sep. 10, 2013

(87) PCT Pub. No.: WO2012/161043
PCT Pub. Date: Nov. 29, 2012

(65) Prior Publication Data
US 2014/0064831 A1   Mar. 6, 2014

(30) Foreign Application Priority Data
May 24, 2011 (JP) .................................. 2011-116368

(51) Int. Cl.
*B62D 27/02* (2006.01)

(52) U.S. Cl.
CPC ........... *B62D 27/02* (2013.01); *Y10T 403/477* (2015.01)

(58) Field of Classification Search
CPC ...... B62D 27/02; B62D 21/00; B23K 26/246; B23K 26/1429; B23K 9/028; B23K 2201/006; Y10T 403/477
(Continued)

(56) References Cited

U.S. PATENT DOCUMENTS 1,867,433 A * 7/1932 Young ........................... 52/506.1
3,171,944 A * 3/1965 Linnander ................. 219/137 R
(Continued)

FOREIGN PATENT DOCUMENTS

EP    1454702    9/2004
FR    2938781    5/2010
(Continued)

OTHER PUBLICATIONS

International Search Report, PCT/JP2012/062478, dated Aug. 21, 2012.
(Continued)

*Primary Examiner* — Victor L Macarthur
(74) *Attorney, Agent, or Firm* — RatnerPrestia (57) ABSTRACT

An automobile frame component includes a closed section constituted by welding a flange portion to a panel part, wherein when a welding position coordinate is represented in a coordinate system in which an end of a contact position between the flange portion and the panel part is assumed as 0, and a flange outer end side of the flange portion is assumed as negative (−) whereas a vertical wall side is assumed as positive (+), and when a radius of a circular arc-like portion connecting a vertical wall portion and the flange portion in the substantially hat-like shape is denoted as R (mm), and a weldable gap amount is denoted as a (mm), a welding position X represented by the following formula is continuously welded using a one-side welding method:

$+\sqrt{(2Ra-a^2)} \geq X > 1.5$ where $R \geq 2$.

2 Claims, 10 Drawing Sheets

(58) Field of Classification Search
USPC .................................................. 403/270–272
See application file for complete search history.

(56) References Cited

U.S. PATENT DOCUMENTS

| | | | |
|---|---|---|---|
| 6,296,299 B1* | 10/2001 | Hanakawa et al. | 296/187.03 |
| 6,474,726 B1* | 11/2002 | Hanakawa et al. | 296/191 |
| 6,794,603 B1 | 9/2004 | Musselman | |
| 7,192,071 B2* | 3/2007 | Watanabe et al. | 296/30 |
| 7,693,696 B2* | 4/2010 | Forrest et al. | 703/7 |
| 7,740,306 B2* | 6/2010 | Ochoa | 296/186.1 |
| 7,921,562 B2* | 4/2011 | Kiji et al. | 29/897 |
| 2001/0007331 A1* | 7/2001 | Iwago et al. | 228/163 |
| 2010/0071434 A1* | 3/2010 | Tamai et al. | 296/203.01 |
| 2010/0115881 A1* | 5/2010 | Inose et al. | 52/783.14 |
| 2012/0048836 A1 | 3/2012 | Diguet et al. | |

FOREIGN PATENT DOCUMENTS

| | | |
|---|---|---|
| JP | 07-032176 | 2/1995 |
| JP | 07-125651 | 5/1995 |
| JP | 2003-200852 | 7/2003 |
| JP | 2010-253545 | 11/2010 |
| WO | 2010061138 | 6/2010 |

OTHER PUBLICATIONS

Canadian Office Action, dated Nov. 7, 2014, in corresponding Canadian Patent Application No. 2,828,707.
Extended European search report, dated Dec. 5, 2014, in corresponding European Patent Application No. 12789441.8.
Canadian Office Action, dated Mar. 17, 2015, in corresponding Canadian Patent Application No. 2,828,707.
Chinese Office Action, dated Mar. 27, 2015, in corresponding Chinese Patent Application No. 201280018712.5.
Korean Office Action, dated Mar. 26, 2015, in corresponding Korean Patent Application No. 10-2013-7024862.
Canadian Office Action for Application No. 2,828,707 dated Aug. 3, 2015.
Chinese Office Action for Application No. 201280018712.5 dated Sep. 21, 2015.
Canadian Office Action dated Nov. 26, 2015 for Application No. 2,828,707.

* cited by examiner

AUTOMOBILE FRAME COMPONENT

FIELD

The present invention relates to an automobile frame component made of thin steel sheets, and particularly to an automobile frame component that has a great influence on stiffness of a automobile body.

BACKGROUND

Figure 8A:
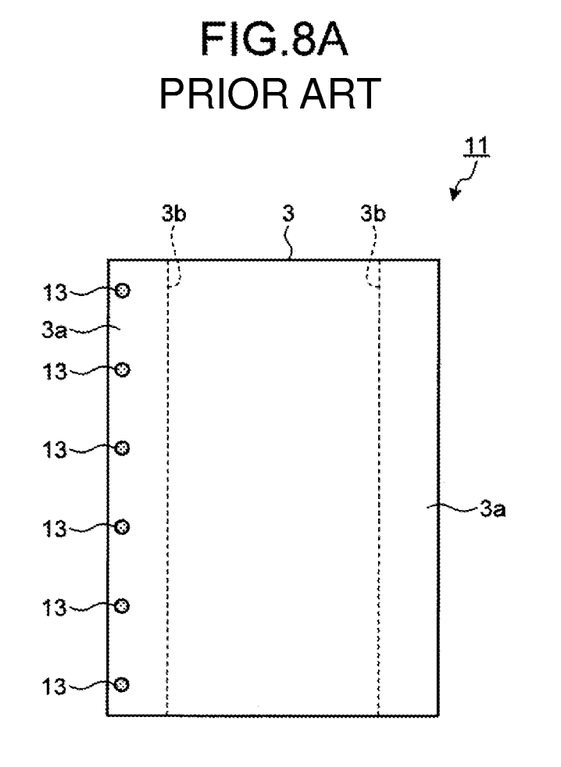
FIG. 8A is a top view of an automobile frame component manufactured by spot welding.
Figure 8B:
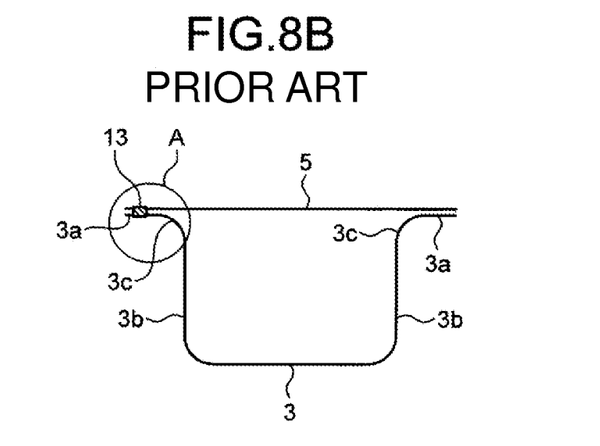
FIG. 8B is a cross-sectional view of the automobile frame component manufactured by spot welding.
Figure 9:
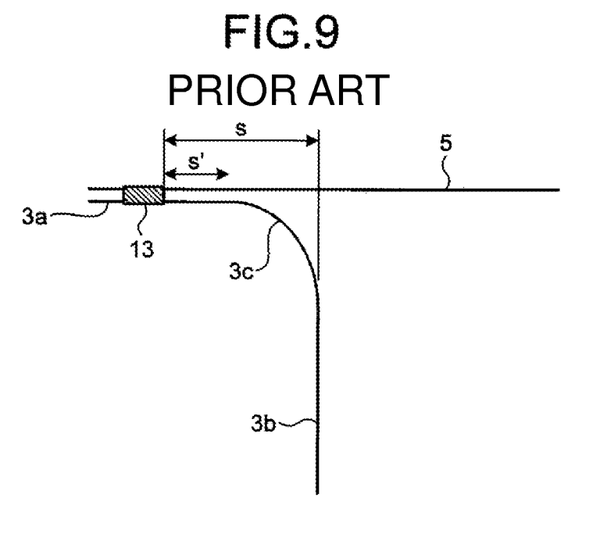
FIG. 9 is an enlarged view of part A of FIG. 8B.

FIG. 8A is a top view of a conventional automobile frame component. FIG. 8B is a cross-sectional view of the automobile frame component. FIG. 9 is an enlarged view of part A illustrated in FIG. 8B. In general, as illustrated in FIG. 8B, an automobile frame component is manufactured so as to constitute a closed section by welding a frame component 3 that includes a flange portion 3a and has a substantially hat-like sectional shape to another frame component or a panel part 5. Such an automobile frame component 11 has conventionally been manufactured by joining the flange portion 3a of the frame component 3 to the other frame component or the panel part 5 using resistance spot welding.

In the resistance spot welding (hereinafter, spot welding), the diameter of spot welding electrodes need to be large, and the electrodes need to be pressed vertically against the flange portion 3a. For this reason, a product is provided with the flange portion 3a having a width of roughly 25 mm, and the flange portion 3a is joined to the other frame component or the panel part 5 by welding the central part of the width.

In contrast, by using continuous welding, such as laser welding or laser-arc hybrid welding which combines laser welding with consumable electrode type arc welding, it is possible to weld a boundary position (contact end between the flange portion 3a and the panel part 5) between the flat flange portion 3a and a circular arc-like portion 3c continuing to a vertical wall portion 3b.

Patent Literature 1 describes a technique that uses laser-arc hybrid welding to apply continuous welding to a position in a range of less than 1.5 mm from the contact end between the flange portion 3a and the panel part 5 toward the vertical wall portion 3b (toward the circular arc-like portion 3c).

CITATION LIST

Patent Literature

Patent Literature 1: Japanese Laid-open Patent Publication No. 2010-253545 (Refer to FIGS. 10A to 11)

SUMMARY

Technical Problem

As illustrated in FIG. 8A, in the automobile frame component in which the central part of the flange portion 3a is spot-welded, portions between adjacent spot-welded portions 13 are non-welded portions. In addition, the welding position is positioned at the central part of the width of the flange portion 3a and outside the boundary position (contact end between the flange portion 3a and the panel part 5) from which the circular arc-like portion 3c continuing to the vertical wall portion 3b begins. Therefore, as illustrated in FIG. 9, a gap portion s (horizontal length of a gap) is formed between the circular arc-like portion 3c of the frame component 3 and the panel part 5 that faces the frame component 3 and that is welded to be joined thereto, and the gap portion s includes a planar gap portion s', thus being a large gap against the spot-welded portions 13. As a result, when the automobile frame component 11 is subjected to a deformation such as torsion, the contact end between the flange portion 3a and the panel part 5 opens, resulting in a significant drop in component stiffness.

Figure 10A:
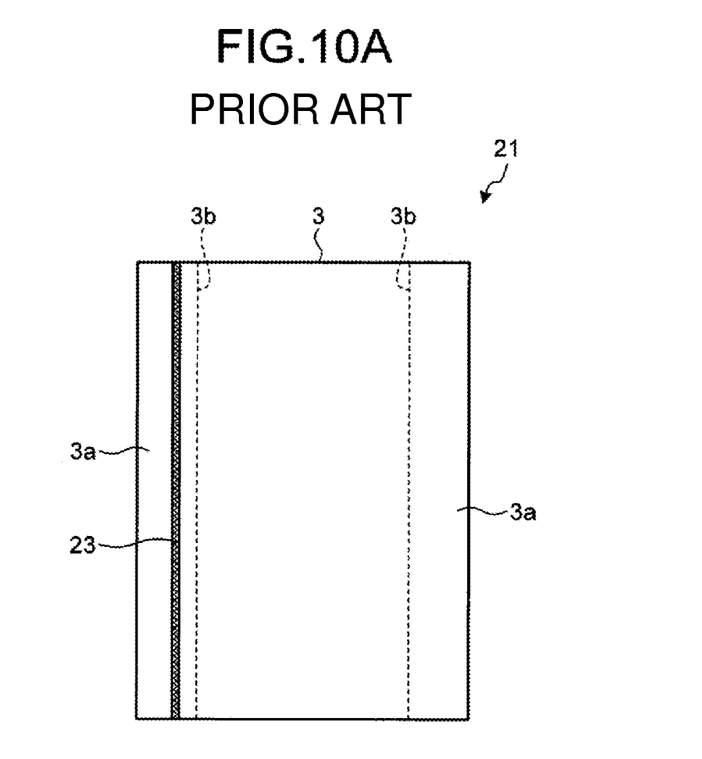
FIG. 10A is a top view of an automobile frame component manufactured by continuous welding.
Figure 10B:
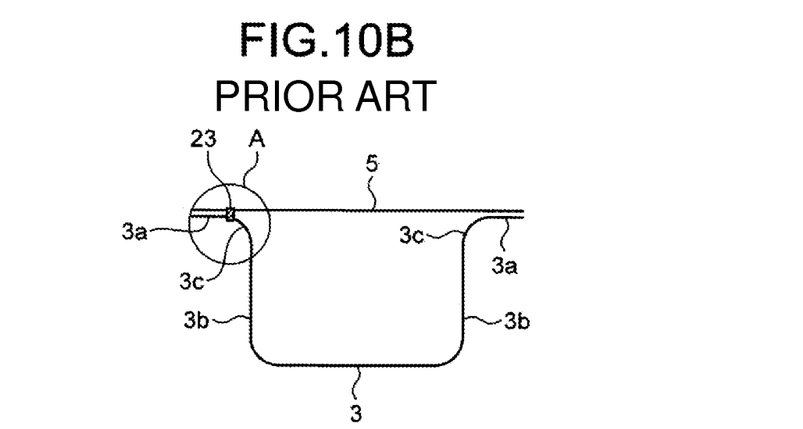
FIG. 10B is a cross-sectional view of the automobile frame component manufactured by continuous welding.
Figure 11:
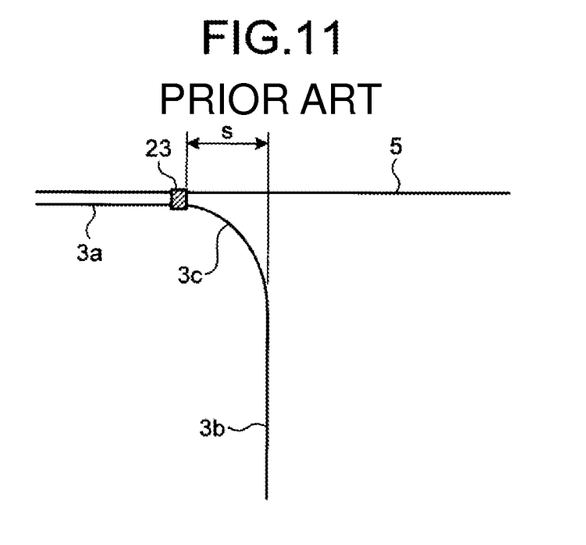
FIG. 11 is an enlarged view of part A of FIG. 10B.

FIG. 10A is a top view of an automobile frame component, such as disclosed in Patent Literature 1, in which the flange portion 3a and the panel part 5 are continuously welded together near the contact end therebetween. FIG. 10B is a cross-sectional view of the automobile frame component. FIG. 11 is an enlarged view of part A illustrated in FIG. 10B. In the case of the automobile frame component manufactured by continuous welding, unlike the case of spot-welding, there is no non-welded portion between welding positions arranged in the direction of the multi-spot welding.

However, in an automobile frame component 21 disclosed in Patent Literature 1, continuous welding is applied to the position in a range of less than 1.5 mm from the contact end between the flange portion 3a and the panel part 5 toward the vertical wall portion 3b (toward the circular arc-like portion 3c). Therefore, the distance of the gap portion s between a welding portion 23 and the vertical wall portion 3b is large, although not so large as that of the above-described spot welding. As a result, when the automobile frame component 21 is subjected to a deformation such as torsion, the region of the gap portion is deformed, resulting in a drop in stiffness of the component. In particular, when the circular arc-like portion 3c of the frame component 3 having a substantially hat-like sectional shape has a large radius, the above-described gap portion s has a large length, so that the stiffness of the component significantly drops.

The present invention has been made in view of the above description, and it is an object thereof to provide an automobile frame component that excels in stiffness.

Solution to Problem

In Patent Literature 1, continuous welding is applied to the position in a range of less than 1.5 mm from the contact end between the flange portion 3a and the panel part 5 toward the vertical wall portion 3b (toward the inside of the circular arc-like portion 3c) for the purpose of preventing blowholes from being formed when alloyed hot-dip galvanized steel sheets are welded, and preventing a strain deformation from occurring associated with thermal shrinkage in welding. In other words, in Patent Literature 1, the position of continuous welding is determined by focusing on welding, and the stiffness of the automobile frame component after being welded is not taken into consideration. The inventors of the present invention have focused on the stiffness of the automobile frame component after being welded, and have come to conceive the present invention through intense studies on what position is desirable to be welded for increasing the stiffness of the automobile frame component.

To solve the problem described above and achieve the object, an automobile frame component according to the present invention includes a closed section constituted by welding a flange portion of a frame component having a substantially hat-like sectional shape to another frame component or a panel part disposed facing the flange portion, wherein when a welding position coordinate is represented in a coordinate system in which an end of a contact position between the flange portion and the other frame component or the panel part is assumed as 0, and a flange outer end side of the flange portion is assumed as negative (−) whereas a vertical wall side in the substantially hat-like shape is assumed as positive (+), and when a radius of a circular arc-like portion connecting the vertical wall portion and the flange portion in the substantially hat-like shape is denoted as R (mm), and a weldable gap amount is denoted as a (mm), a welding position X represented by the following formula is continuously welded using a one-side welding method:

$$+\sqrt{(2Ra-a^2)} \geq X > 1.5 \text{ where } R \geq 2.$$

Moreover, in the automobile frame component described above, the one-side welding method is a laser-arc hybrid welding method, in which the welding position X represented by the following formula is continuously welded using the one-side welding method:

$$+\sqrt{(2R-1)} \geq X > 1.5 \text{ where } R \geq 2.$$

Advantageous Effect of Invention

According to the present invention, stiffness of an automobile frame component can be increased.

DESCRIPTION OF EMBODIMENT

An embodiment of the present invention will be described in detail with reference to the accompanying drawings. The present invention is, however, not limited by the embodiment. In the description of the drawings, the same numerals are given to the same parts.

Figure 1A:
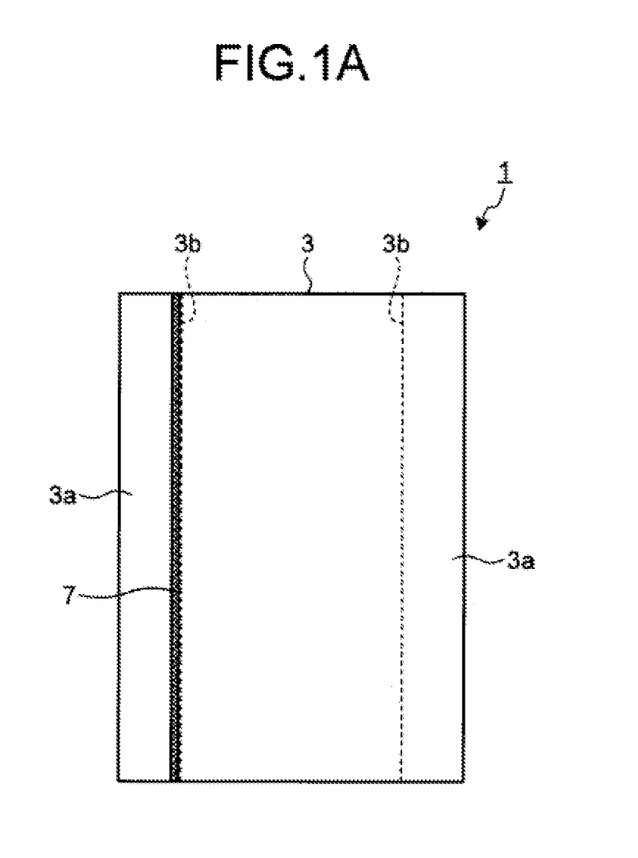
FIG. 1A is a top view illustrating a schematic configuration of an automobile frame component according to an embodiment of the present invention.
Figure 1B:
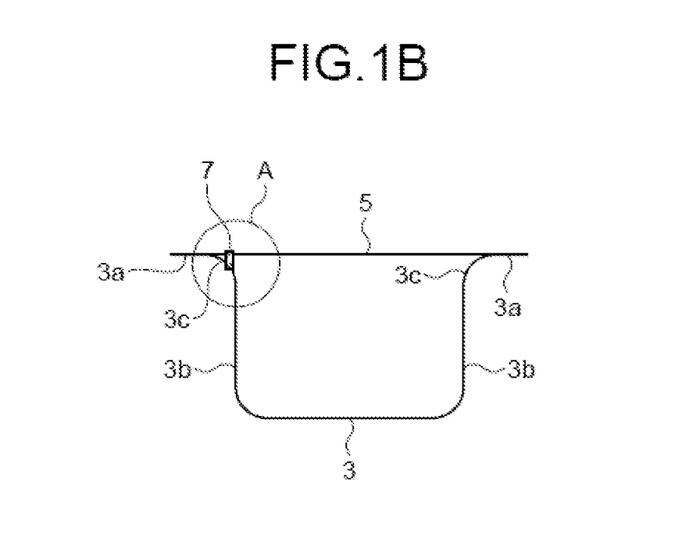
FIG. 1B is a cross-sectional view illustrating the schematic configuration of the automobile frame component according to the embodiment of the present invention.
Figure 2:
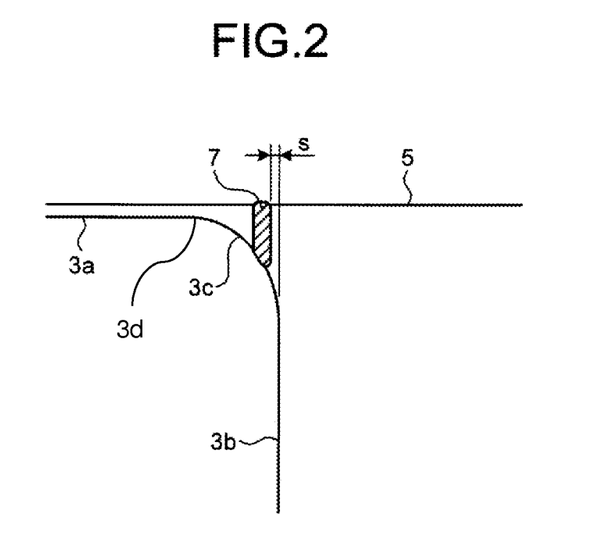
FIG. 2 is an enlarged view of part A of FIG. 1B.

FIG. 1A is a top view of an automobile frame component of the present embodiment. FIG. 1B is a cross-sectional view of the automobile frame component. FIG. 2 is an enlarged view of part A illustrated in FIG. 1B. As illustrated in FIGS. 1A and 1B, this automobile frame component 1 according to the present embodiment is manufactured to constitute a closed section by continuously welding, at a welded portion 7, a flange portion 3a of a frame component 3 having a substantially hat-like sectional shape to a panel part 5 disposed facing the flange portion 3a.

In the present embodiment, as illustrated in FIG. 2, welding is performed in a position that is located in a circular arc-like portion 3c between a vertical wall portion 3b and the flange portion 3a in the frame component 3 having a substantially hat-like sectional shape and that is shifted toward the circular arc-like portion 3c from an inner end 3d of the flange portion 3a, inner end 3d being a point at which the circular arc-like portion 3c meets the flange portion 3a. Details of the welding position will be described later.

A method of continuous welding only needs to be a method that enables welding from one side, such as laser welding or laser-arc hybrid welding which is a combination of laser welding and arc welding using a consumable electrode. It should be noted that different welding methods have different limit values of a weldable inter-sheet gap amount a. Therefore, when the present invention is applied, a welding method only needs to be selected according to the inter-sheet gap amount a in the welding position.

In laser-arc hybrid welding combining laser welding with the arc welding, a molten wire is fed to a joined portion, and thus, welding can be performed with a larger inter-sheet gap amount a than in the case of a welding method using only laser welding. It is experimentally known that laser-arc hybrid welding can be achieved when the gap amount a is roughly 1 mm.

Figure 3:
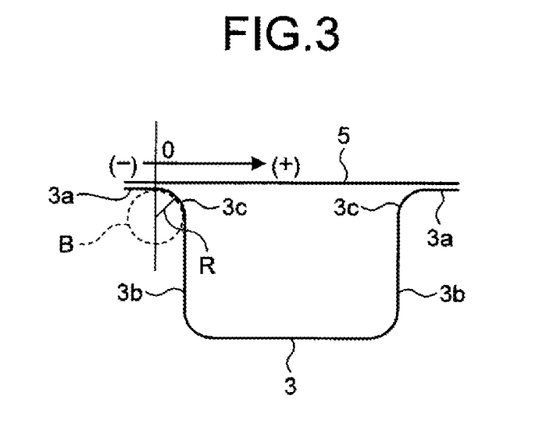
FIG. 3 is an explanatory diagram for explaining a coordinate of a welding position in the embodiment of the present invention.

FIG. 3 is a diagram for explaining a coordinate of the welding position in the embodiment of the present invention. As illustrated in FIG. 3, the welding position coordinate is represented in a coordinate system in which the end of the contact position (contact end) between the flange portion 3a and the panel part 5 is assumed as 0, and the flange outer end side of the flange portion 3a is assumed as negative (−) whereas the vertical wall side in the substantially hat-like shape is assumed as positive (+). The radius of the circular arc-like portion 3c connecting the vertical wall portion 3b and the flange portion 3a in the substantially hat-like shape is denoted as R (mm), and the weldable gap amount is denoted as a (mm). Then, the automobile frame component 1 of the present embodiment is characterized to be formed by continuously welding a welding position X represented by the following formula using the one-side welding method.

$$+\sqrt{(2Ra-a^2)} \geq X > 1.5 \text{ where } R \geq 2$$

The reason why the welding position X is set larger than 1.5 mm is that the stiffness of the automobile frame component 1 rapidly increases as the welding position X exceeds 1.5 mm, as will be illustrated in an example described later.

The reason why the welding position X is set to $+\sqrt{(2Ra-a^2)}$ or less is as follows. That is, as will be verified by the example described later, from the viewpoint of increasing the stiffness, welding is more advantageous as the welding position X shifts from the contact end between the flange portion 3a and the panel part 5 to a position as near as possible to the vertical wall portion 3b. However, a position corresponding to the weldable gap amount a is employed as the upper limit value because the weldable inter-sheet gap amount a is determined by the welding method. It is important to perform welding in a position near the upper limit value, from the viewpoint of increasing the stiffness of the automobile frame component 1.

Figure 4:
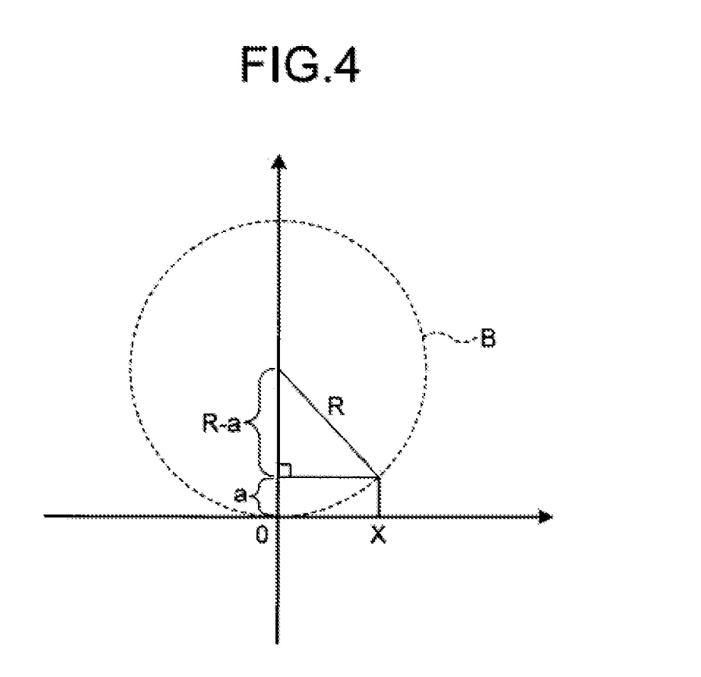
FIG. 4 is an explanatory diagram of a method of obtaining the welding position in the embodiment of the present invention.

Based on FIG. 4, a description will be made of a method of obtaining $\sqrt{(2Ra-a^2)}$ that is the upper limit value of the welding position X. FIG. 4 is a diagram for explaining the method of obtaining the welding position in the embodiment of the present invention. A circle B indicated by a dashed line in FIG. 4 is the circle B that includes the circular arc-like portion 3c connecting the vertical wall portion 3b and the flange portion 3a in the frame component 3 having a substantially hat-like sectional shape (refer to FIG. 3). When the weldable inter-sheet gap amount is denoted as a, a relation $(R-a)^2 + X^2 = R^2$ holds as is found from FIG. 4. Solving this relation with respect to X gives $X = \sqrt{(2Ra-a^2)}$. This value of X corresponding to the gap amount a is defined as the upper limit value.

It is experimentally known that laser-arc hybrid welding can be achieved when the gap amount a is roughly 1 mm. Therefore, denoting the radius of the circular arc-like portion 3c of the frame component 3 having a substantially hat-like sectional shape as R (mm), and then substituting a=1 into $\sqrt{(2Ra-a^2)}$ leads to a finding that the range is $\sqrt{(2R-1)}$ mm within which the inter-sheet gap amount a is 1 mm or less from a flat portion of a welded part facing the flange portion 3a of the frame component 3. Stated conversely, in a range of $\sqrt{(2R-1)}$ mm or less from the contact end between the flange portion 3a and the panel part 5, the inter-sheet gap amount a is 1 mm or less from a flat portion of the welded panel part 5 facing the flange portion 3a of the frame component 3, and thus, laser-arc hybrid welding can be used for welding.

As described above, the automobile frame component of the present embodiment is welded in the position shifted toward the circular arc-like portion from the contact end between the flange portion 3a and the panel part 5. Therefore, only a small gap portion s is produced between the frame component 3 and the facing panel part 5 welded thereto. Therefore, when a load is applied to the automobile frame component 1 to produce a deformation thereof, the gap portion s is kept from opening, and thus the stiffness of the automobile frame component 1 can be increased.

An automobile body to which the automobile frame component 1 according to the present invention is applied has high stiffness and excels in stability in handling, and in addition, can compensate for reduction in stiffness of the automobile frame component that is thin-walled for weight reduction, thereby being capable of contributing to the weight reduction of the automobile body.

The embodiment described above is merely an example for implementing the present invention. The present invention is not limited to the example, and it is within the scope of the present invention to make various modifications according to specifications or the like. Furthermore, it is obvious from the description above that other various embodiments are possible within the scope of the present invention.

It should be noted that the effect of the present invention does not depend on the type of steel, such as a hot-rolled steel sheet, a cold-rolled steel sheet, or a galvanized steel sheet.

Although the above-described example exemplifies the panel part 5 as a part welded to the frame component 3 having a substantially hat-like sectional shape, another frame component may be welded instead of the panel part 5.

Example

Figure 5:
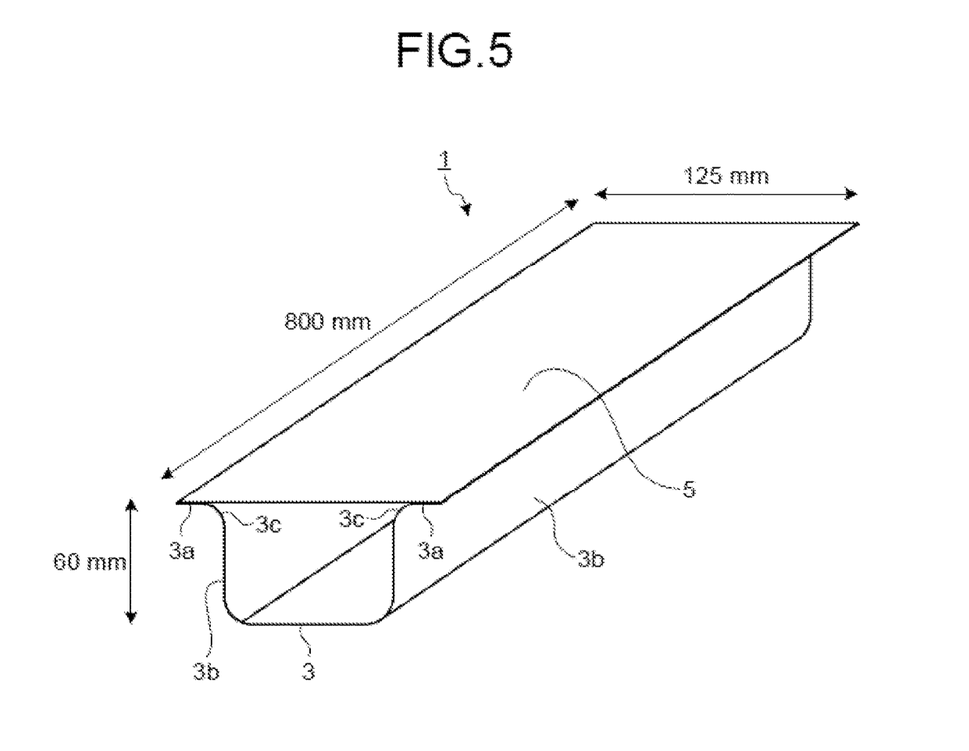
FIG. 5 is an explanatory diagram of a test specimen used in a test for verifying an effect of the present invention.

Test specimens of the automobile frame component having a substantially hat-like sectional shape were used to conduct a torsion test and verify the effect of the present invention. FIG. 5 is a diagram for explaining a test specimen used in the test. As illustrated in FIG. 5, the test specimen used in the test was a straight component having a length of 800 mm in the longitudinal direction. The circular arc-like portion 3c interposed between the flange portion 3a and the vertical wall portion 3b of the hat section had a radius of 10 mm, and the flange width was 25 mm.

Figure 6:
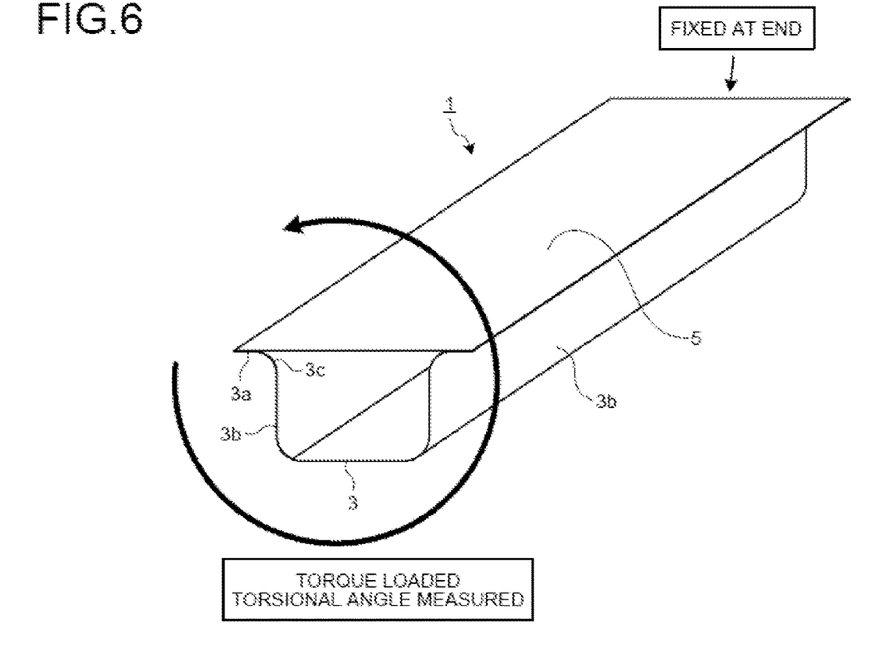
FIG. 6 is an explanatory diagram of a test method for verifying the effect of the present invention.

The material used for the test specimen was a cold-rolled steel sheet having a tensile strength of 270 MPa or more and a thickness of 1.6 mm. FIG. 6 is a diagram for explaining the method of the test. As illustrated in FIG. 6, one end of the test specimen was fixed, and torque of 0.2 kNm was applied to the opposite other end thereof. The rotation angle produced at that time was measured, and a stiffness value was calculated.

Laser-arc hybrid welding was used for continuous welding, and the stiffness value was measured by conducting the torsional stiffness test with the welding position being changed in the range from the "central part in the width direction of the flange portion 3a" to a "position 6 mm from a contact end between the flange portion 3a and the panel part 5".

Table 1 illustrates relations among the welding position, the inter-sheet gap, and weld quality. Note that the "welding position" in Table 1 represents a distance toward the vertical wall portion 3b from the contact end between the flange portion 3a and the panel part 5.

TABLE 1

| | Welding position mm | Inter-sheet gap mm | Weld quality |
|---|---|---|---|
| 1 | 2 | 0.20 | Good |
| 2 | 3 | 0.46 | Good |
| 3 | 4 | 0.83 | Good |
| 4 | 5 | 1.33 | Large underfill |
| 5 | 6 | 2.0 | Melting-down |

Figure 7:
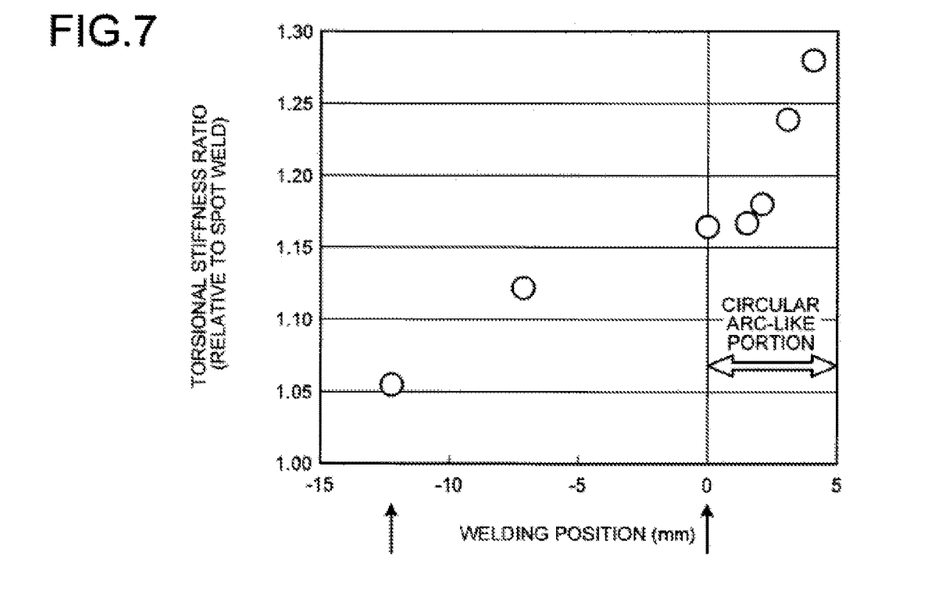
FIG. 7 is a graph of test results for verifying the effect of the present invention.

FIG. 7 illustrates test results of the stiffness test. FIG. 7 is a graph of the test results. The horizontal axis represents the welding position, and the vertical axis represents a torsional stiffness ratio. The torsional stiffness ratio represents the stiffness ratio of each of the test specimens, assuming the torsional stiffness value of the test specimen that was spot-welded at the central part having the width of the flange portion 3a as 1, as a comparative example.

As illustrated in FIG. 7, the stiffness ratio was increased by roughly 5% by continuously welding the central part of the width of the flange portion 3a. The stiffness ratio gradually increased as the welding position moved from the central part of the width of the flange portion 3a to the contact end between the flange portion 3a and the panel part 5. Furthermore, the stiffness ratio leveled off until the welding position moved to the position roughly 1.5 mm toward the vertical wall portion 3b from the contact end (0 mm) between the flange portion 3a and the panel part 5.

Moreover, in the range from 1.5 mm to 4 mm, the stiffness ratio rapidly increased. Thus, the stiffness increasing effect provided by the present invention was verified in consideration that $\sqrt{(2R-1)} = 4.35$.

As illustrated in Table 1, although continuous welding operations were tried in welding positions 5 mm and 6 mm from the contact end between the flange portion 3a and the panel part 5, the inter-sheet gap amounts were so large there as illustrated in Table 1 that welding defects such as underfill and melting-down occurred. This indicates that the welding position needs to be set so that the inter-sheet distance is within the weldable gap amount a (=1 mm).

INDUSTRIAL APPLICABILITY

The present invention can be applied to an automobile frame component that is made of thin steel sheets and has a great influence on stiffness of a automobile body.

REFERENCE SIGNS LIST s Gap portion
1 Automobile frame component
3 Frame component
3a Flange portion
3b Vertical wall portion
3c Circular arc-like portion
5 Panel part
7 Welded portion
11 Automobile frame component (prior art)
13 Spot-welded portion
21 Automobile frame component (prior art)
23 Welding portion

The invention claimed is:

1. An automobile frame component made of thin steel sheets, comprising:
a closed section including:
a frame component having a substantially hat sectional shape, the frame component including a flange portion, a vertical wall portion, and an arc portion connecting an inner end of the flange portion and the vertical wall portion;
another frame component or a panel part disposed facing the flange portion of the frame component; and
a welded portion connecting the arc portion of the frame component and the other frame component or panel part, the welded portion extending along the other frame component or panel part in a direction parallel to the flange portion of the frame component, the welded portion continuously welded using a one-side welding method to improve stiffness of the automobile frame component, wherein
a radius of curvature of the arc portion is denoted as R mm,
an inter-sheet gap amount between the flange portion and the other frame component or panel part is denoted as a mm,
a distance between the inner end of the flange portion and the welded portion in a direction parallel to a surface of the flange portion is denoted as X mm, and
only those values of R, a, and X that satisfy all of the following formulas are selected:

$X > 1.5$ mm;

$R \geq 2$ mm;

$1 \text{ mm} \geq a > 0$ mm;

$+\sqrt{(2Ra-a^2)}$ mm $> 1.5$ mm; and $+\sqrt{(2Ra-a^2)}$ mm $\geq X$.

2. The automobile frame component according to claim 1, wherein the one-side welding method is a laser-arc hybrid welding method, and the welding position X is continuously welded using the one-side welding method.

* * * * *